UNITED STATES PATENT OFFICE 2,238,975

PLASTIC COMPOSITION

John T. K. Crossfield, Brooklyn, N. Y.

No Drawing. Application October 1, 1938,
Serial No. 232,880

4 Claims. (Cl. 260—746)

This invention relates to improvements in plastic compositions and methods of manufacturing the same and pertains particularly to such a composition which may be employed as a protective surface coating or as a wear-resistant coating or surfacing for use in covering floors or other surfaces which are subjected to wearing action.

The principal object of the present invention is to provide an improved rubber latex base composition which may be employed per se as a coating or surfacing material or form the base for various mixtures having a variety of uses as covering materials.

At the present time no entirely satisfactory composition is available for making floor coverings of a light or thin character and without the use of specially prepared undercoatings or inserts which permit of the expansion and contraction of the flooring material without cracking. For example, floors of the terazzo type are required to be laid upon a special base and must be divided into areas separated by expansion joints in order to prevent them from cracking as the result of expansion and contraction. The composition of the present invention may be employed successfully in the laying of terazzo floors by mixing suitable aggregate therewith and spreading the mixture upon any suitable base and does not require the use of expansion inserts to prevent cracking. In addition the present composition is adaptable to many other similar uses by mixing various substances therewith or it may be employed by itself as a coating and covering material or as a resilient insert between other materials.

The composition embodying the present invention broadly consists of a paste of rubber latex with aluminous and/or Portland cement. Aluminous cement comprises a mixture of bauxite and calcined limestone which are ground together to the fineness desired. In the manufacture of the paste composition it has been found that the rubber latex will only mix with the cements named to form a smooth paste when the pH of the latex is within certain limits. Attempts have been made heretofore to produce a composition like the present one by the mixing together of rubber latex and Portland cement or aluminous cement, but such attempts have been unsuccessful due to the fact that the knowledge was lacking of the required pH of the latex. If the pH value of the latex is not within the range specified, attempts to mix the same with the cements mentioned result in very indifferent materials when the pH is within one or two points above or below the range specified and if beyond this, premature coagulation takes place, resulting in coagulated masses which are unsuitable for any commercial use.

The rubber latex employed in the present composition may have a dry rubber content of from 20 to 75%. The rubber content is adjusted in accordance with the use to which the composition is to be put. The latex is tested after adjusting the dry rubber content to the desired percentage by the addition of water to the latex, to determine the pH value and this value is then changed if necessary, so that it will fall between 11.1 and 11.4 pH. If it is found that the pH value of the latex is below 11.1, it is raised by the addition of a suitable alkali, such as potassium hydroxide, sodium hydroxide, ammonium hydroxide or any other alkali, and if the pH value is higher than it should be, it is lowered by the addition of a suitable acid. Any of the inorganic acids in weak solution may be used such as hydrochloric, sulphuric, nitric or any milder acid such as boric acid. The latter acid is preferred for making this adjustment of the pH value. After making the required adjustment of the dry rubber content of the latex and also of the pH value, if the latter adjustment is necessary, there is then added to the latex a suitable stabilizer which will serve to prevent its premature coagulation when the cement is mixed therewith. Any suitable commercially known latex stabilizer may be employed such as sulphonated lorol, gum arabic, agar agar, caustic soap solutions and casein glue, the latter being very good for the purpose and may be added to the latex in the proportion of 2 to 3% of the weight of the latex. After making the described adjustments in connection with the latex and adding the stabilizer thereto, there is then added the aluminous or Portland cement to form the paste, the proportions of the latex and cement varying, as previously stated, in accordance with the use to which the paste is to be put. As has been previously stated, it is found that the successful working of the process requires that the pH of the latex be between 11.1 and 11.4 when in its final concentration ready for mixing with the cement. Should the pH of the latex portion of the mix be below 11.1, a very indifferent mixture results and if much below, it is impossible to mix it successfully with the cement as the resulting mixture coagulates in such a way that a smooth paste cannot be formed and if the pH is above 11.4, the resulting paste becomes too thick for easy working and the setting of the final product is badly affected.

The latex and cement paste may be employed for certain purposes without the addition of other substances thereto or it may have added thereto any desired type of aggregate, depending upon the use to which the composition is to be put, as for example, there may be added granulated cork, stone chips, rubber particles, volcanic ash, obsidian, sand, etc.

As an illustration of various mixes which may be prepared and without intending to limit the invention in any respect, the following examples are given for the making of the paste composition.

Example 1

| | Pounds |
|---|---|
| Rubber latex, 50% dry rubber content | 100 |
| Aluminous and/or Portland cement | 150 | are mixed together to form a smooth paste, any suitable type of mixing machine being employed. This paste mix is suitable for use as a floor covering when it has had a suitable aggregate such as sand, marble chips or cork added thereto. A suitable floor surfacing material using sand as an aggregate would be produced by adding to the above mixture 200 lbs. of sand or 500 lbs. of marble in coarse chips or from 30 to 40 lbs. of ground or granulated cork. Highly satisfactory results have been obtained with floors prepared from a mixture of marble or sand with a paste of the above composition and such floors have the advantage over other types of resilient or semi-resilient floor surfacing that no special base has to be prepared and the mixture may be laid with a thickness of from only ¼ to ½". The composition has also been found to be highly satisfactory for surfacing ship decks, particularly when made with granulated cork as it provides a resilient surface which will not become slippery when wet and which may be laid directly upon metal sheeting without requiring cleats or other elements to bind it to the metal. In addition to this, the composition has the advantage that when it is laid upon a metal supporting surface, it will not corrode or rust the metal but on the other hand protects the same effectively from such corrosion. This fact has made the paste product of particular value as a surfacing for the exterior of ships' hulls, upon which it has actually been used and found to give highly satisfactory results.

As a second example, the following is given:

Example 2

| | Pounds |
|---|---|
| Rubber latex, 70% dry rubber content | 100 |
| Aluminous and/or Portland cement | 100 | are combined to form a smooth paste. A paste made according to this example is especially suitable for damp-proofing or covering materials where a high degree of resilience is required and where it is desired to mix an aggregate with the paste of this composition, there may be employed approximately 100 lbs. of coarse aggregate such as stone chips or the like, 50 lbs. of sand, or 25 lbs. of cork.

One use for which the paste of Example 2 is particularly suitable is for covering floors of cellars or other surfaces which are exposed to dampness and moisture. This paste may also be employed as a surface covering for dams and similar structures which are constantly subjected to wet.

Example 3

| | Pounds |
|---|---|
| Rubber latex, 20% dry rubber content | 100 |
| Aluminous and/or Portland cement | 300 | may be mixed together. This paste when combined with stone or similar coarse aggregate in the amount of 600 lbs. or with 500 lbs. of sand or 75 lbs. of cork may be used as a cheap fill where a top fill or surfacing of finer grade is to be laid.

From the foregoing, it will be apparent that there is produced according to the present invention, a composition having a wide variety of uses and of such character that when used as a floor or other surface covering, it will provide a non-slippery resilient support which may be laid relatively thinly as compared with other surface coverings without sacrificing the wear-resisting qualities of other coverings while at the same time giving a covering of lighter weight, thus making the surfacing particularly valuable for ships' decks or similar structures where it is desirable that excess weight be avoided.

What is claimed is:

1. The process of forming a plastic composition of the character described which comprises adjusting the hydrogen ion concentration of rubber latex to a value between 11.1 and 11.4 pH, and then mixing therewith a cement selected from the group consisting of aluminous cement and Portland cement to form a pasty mass.

2. The process of forming a plastic composition of the character described which comprises adjusting the dry rubber content of rubber latex to a desired quantity ranging from 20 to 75%, then adjusting the hydrogen ion concentration of the latex to a value between 11.1 and 11.4 pH, then mixing with the rubber latex a cement selected from the group consisting of aluminous cement and Portland cement to form a pasty mass.

3. The process of forming a plastic composition of the character described which comprises adjusting the hydrogen ion concentration of rubber latex to a value between 11.1 and 11.4 pH, and then mixing therewith a cement selected from the group consisting of aluminous cement and Portland cement to form a pasty mass, and finally mixing a filler with the mass consisting of a coarse aggregate selected in accordance with the use to which the composition is to be put.

4. The process of preparing a plastic composition of the character described which comprises adjusting the dry rubber content of rubber latex to from 20 to 75% by the addition of water thereto, then adjusting the hydrogen ion concentration of the latex to a value between 11.1 and 11.4 pH, then adding a stabilizer to the latex, and finally mixing with the latex a cement selected from the group consisting of aluminous cement and Portland cement to form a workable mass.

JOHN T. K. CROSSFIELD.